(12) United States Patent
Houston

(10) Patent No.: US 6,731,445 B1
(45) Date of Patent: May 4, 2004

(54) DISK DRIVE HAVING DPS LOGGING SECTOR

(75) Inventor: Akil Houston, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 09/598,082

(22) Filed: Jun. 21, 2000

(51) Int. Cl.$^7$ .............................. G11B 5/02; G11B 19/04
(52) U.S. Cl. .............................. 360/55; 360/60; 360/48
(58) Field of Search ............................ 360/60, 48, 31, 360/55; 369/53; 711/112

(56) References Cited

U.S. PATENT DOCUMENTS

| | | | |
|---|---|---|---|
| 5,406,425 A | * 4/1995 | Johnston et al. | ............... 360/48 |
| 5,574,882 A | * 11/1996 | Menon et al. | ............... 711/114 |
| 5,737,342 A | * 4/1998 | Ziperovich | ................... 714/736 |
| 6,185,661 B1 | * 2/2001 | Ofek et al. | .................. 711/145 |
| 6,272,086 B1 | * 8/2001 | Jaquette et al. | .......... 369/53.21 |

\* cited by examiner

*Primary Examiner*—David Hudspeth
*Assistant Examiner*—Glenda Rodriguez

(57) ABSTRACT

A disk drive contains at least one sector that is protected from erasure, such as an erasure that may occur during reformatting. The sector(s) is used to store information related to one or more tests that may be performed on the disk drive and/or on other devices of a computer system in which the disk drive is located. This information may be used to facilitate a subsequent evaluation of the disk drive and/or computer system.

75 Claims, 2 Drawing Sheets

DISK DRIVE HAVING DPS LOGGING SECTOR

BACKGROUND OF THE INVENTION

1. Field Of The Invention

The present invention relates generally to a technique for retaining information on a host computer and, more specifically, to a technique for retaining test and identity information in a protected sector of a computer drive.

2. Description Of The Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer systems are used for a wide variety of applications including personal computing. Typically, a computer system includes a hard drive. The hard drive may store various programs and instruction sets which may be used to control the system, implement various software programs stored in the system, and store desired information. Often, system errors occur and the hard drive is removed and sent to a supplier or a computer vendor for evaluation and possible debugging and repair. Oftentimes, however, the error resides in the operating system rather than the hard drive. Thus, drives are often removed and sent for repair by users who erroneously believe that there is a drive failure. Aside from wasting time and resources diagnosing a false failure detection, the removal, shipping, testing, and reinstallation of a drive may actually damage the device.

Another problem associated with the repair of hard drives is the fact that a user can reformat the hard drive. If the hard drive has not been reformatted, the drive supplier tasked with repairing the drive can extract certain information from the hard drive which may be helpful in determining the origin of the failure. However, more often the hard drive is returned to the supplier after having been reformatted. A reformatting of the hard drive generally overwrites information such as the original operating system type, the system serial number, factory information, etc. Often, there are no self tests which may be implemented by a user to verify a drive failure before the drive is removed from the system. In other words, most system tests are host based and can only be performed by the drive supplier. Not only may a hard drive contain initial setup information, but it may contain information pertaining to new operating systems which may have been installed or new components and drives which may have been added to the system, any of which may contribute to a hard drive failure. Thus, valuable troubleshooting information may be permanently lost if the drive is reformatted.

The present invention may address one or more of the problems set forth above.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one embodiment of the present invention, a disk drive contains at least one sector that is protected from erasure, such as an erasure that may occur during reformatting. The sector(s) is used to store information related to one or more tests that may be performed on the disk drive and/or on other devices of a computer system in which the disk drive is located. This information may be used to facilitate a subsequent evaluation of the disk drive and/or computer system.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
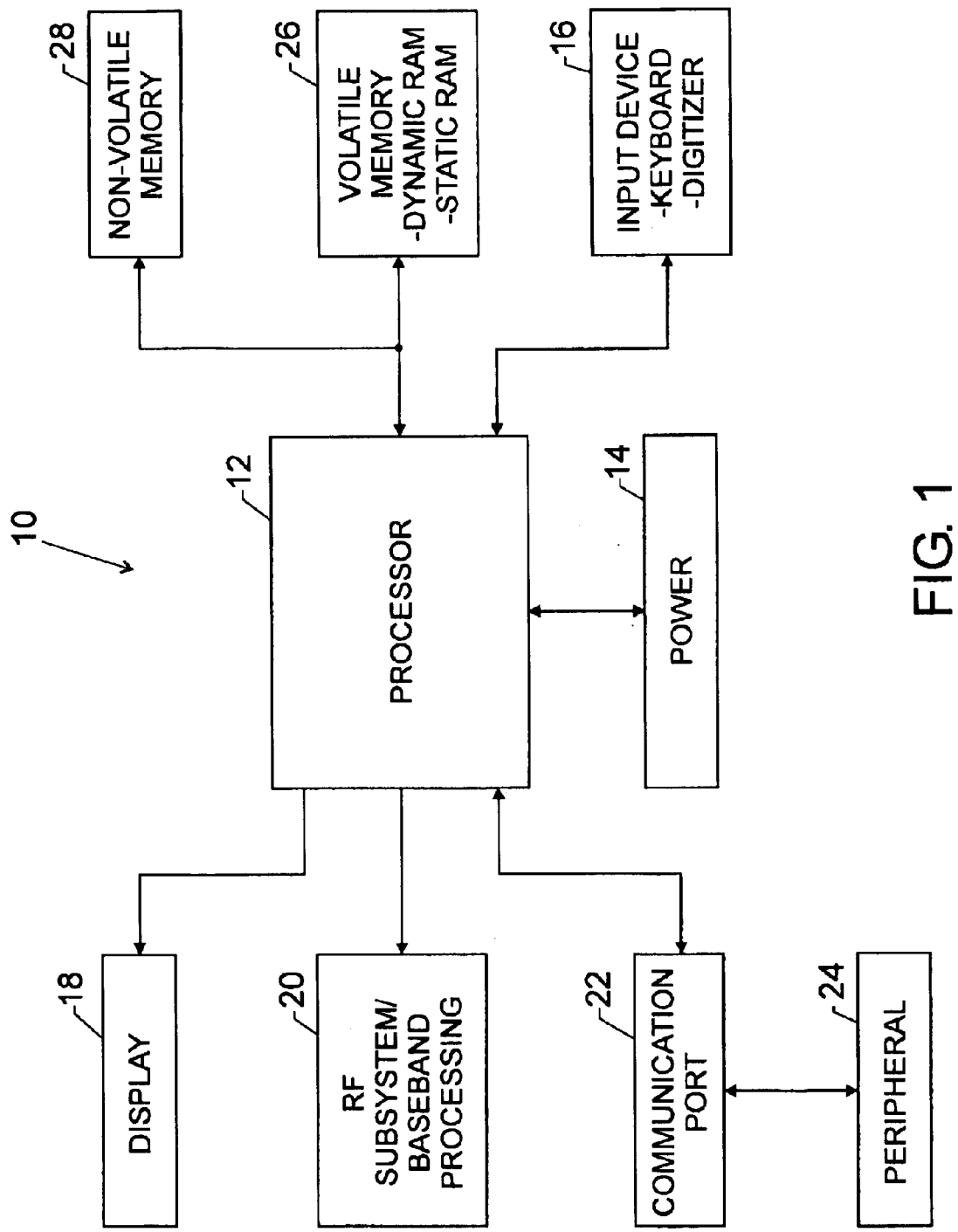
FIG. 1 illustrates a block diagram of an exemplary processor-based device in accordance with the present invention.

Turning now to the drawings, and referring initially to FIG. 1, a block diagram depicting an exemplary processor-based device, generally designated by the reference numeral 10, is illustrated. The device 10 may be any of a variety of different types, such as a computer, pager, cellular telephone, personal organizer, control circuit, etc. In a typical processor-based device, a processor 12, such as a microprocessor, controls many of the functions of the device 10.

The device 10 typically includes a power supply 14. For instance, if the device 10 is portable, the power supply 14 would advantageously include permanent batteries, replaceable batteries, and/or rechargeable batteries. The power supply 14 may also include an A/C adapter, so that the device may be plugged into a wall outlet, for instance. In fact, the power supply 14 may also include a D/C adapter, so that the device 10 may be plugged into a vehicle's cigarette lighter, for instance.

Various other devices may be coupled to the processor 12, depending upon the functions that the device 10 performs. For instance, a user interface 16 may be coupled to the processor 12. The user interface 16 may include buttons, switches, a keyboard, a light pin, a mouse, and/or a voice recognition system, for instance. A display 18 may also be coupled to the processor 12. The display 18 may include an LCD display, a CRT, LEDs, and/or an audio display.

Furthermore, an RF subsystem/baseband processor 20 may also be coupled to the processor 12. The RF subsystem/baseband processor 20 may include an antenna that is coupled to an RF receiver and to an RF transmitter (not shown). A communications port 22 may also be coupled to the processor 12. The communications port 22 may be adapted to be coupled to a peripheral device 24, such as a modem, a printer, or a computer, for instance, or to a network, such as a local area network or the Internet.

Because the processor 12 controls the functioning of the device 10 generally under the control of software programming, memory is coupled to the processor 12 to store and facilitate execution of the program. For instance, the processor 12 may be coupled to volatile memory 26, which may include dynamic random access memory (DRAM) and/or static random access memory (SRAM). The processor 12 may also be coupled to non-volatile memory 28. The non-volatile memory 28 may include a read only memory (ROM), such as an EPROM or Flash-Memory, to be used in conjunction with the volatile memory. The size of the ROM is typically selected to be just large enough to store any necessary operating system, application programs, and fixed data. The volatile memory, on the other hand, is typically quite large so that it can store dynamically loaded applications. Additionally, the non-volatile memory 28 may include a high capacity memory such as a disk drive, tape drive memory, CD ROM drive, DVD, read/write CD ROM drive, and/or a floppy disk drive.

As discussed above, if the disk drive of the device 10 is believed to have failed, a user often removes the disk drive from the device 10 and has it tested. If the disk drive has been reformatted at some time—to store a new operating system, for instance—valuable information originally stored on the disk drive, such as factory information, the system serial number, operating system type, etc., will likely have been lost. Thus, it may be impossible for the tester to determine whether the disk drive has actually failed or whether it may simply contain programs or information that is not compatible with the device in which it is currently installed.

To address this concern, a Drive Protection System (DPS) is provided. It was recognized that certain sectors of currently manufactured disk drives are protected from erasure during reformatting operations under an industry standard. In the present embodiment of the DPS, some of these protected sectors have been reserved to store information regarding the disk drive and the corresponding device 10. In particular, as discussed in more detail below, the selected sectors may be defined to store information relating to one or more Drive Self Tests (DST). Thus, if a disk drive having information stored on it by a DPS is tested, much valuable information will be present on the disk drive to facilitate the testing procedures.

Before the logging capabilities of the present DPS existed, there was no means of retaining initial factory test data or retaining subsequent user-implemented test data. This technology, however, may be used to allow a vendor to record permanent information on the hard drive. This information can later be retrieved regardless of whether the end user reformats the drive. This may be valuable because the archived information on a computer system contains useful troubleshooting data from initial factory test data through user test data. Each time the DST is executed by a system vendor or a system user, information about the computer system is gathered and logged into selected sectors on the hard drive using the protocol, technique, and data structure described herein.

Generally, the protocol uses an industry standard ATA command to write system vendor specific data to designated sectors on the hard drive. As mentioned above, currently manufactured ATA hard drives include a number of reserve sectors. When a system vendor such as Compaq receives a hard drive from a drive vendor, certain sectors are reserved for items such as error logging, self-tests, and vendor specific applications as indicated in Table 1 below. Approximately 255 logging sectors (80h–9Fh) are reserved for reading and writing by a system vendor. The purpose of the various other logging sectors is not critical to understanding the present invention. The sectors being used in the present technique are sectors 80h–83h which are designated as the DPS Sectors in Table 1, while other sectors are illustrated as being designated for other purposes. For example, sector 06h has been reserved to store the DST in this example. It should be understood, however, that the selection of the sectors 80h–83h is somewhat arbitrary, as fewer, more, or different protected sectors could be used to store DPS information.

TABLE 1

| Logging Sector Number | Purpose | R/W |
| --- | --- | --- |
| 00h | Reserved | TBD |
| 01h | SMART Drive Error Logging | RO |
| 02h–05h | Reserved for Smart Error Log Extension | RO |
| 06h | Reserved for Drive Self-Test | RO |
| 07h–7Fh | Reserved | TDB |
| 80h–83h | DPS Sector(s) | R/W |
| 84h–9Fh | System Vendor Specific | R/W |
| A0h–BFh | Device Vendor Specific | VS |
| C0h–FFh | Vendor Specific | VS |

Key
RO - Sector is read only by the host.
R/W - Sector is read or write by the host.
TBD- Sector is reserved and read/write status will be assigned when the address is assigned.
VS - Sector is vendor specific thus read/write ability is vendor specific.

Table 2 illustrates, by way of example, specific structures of the four DPS sectors of this embodiment. Each sector 80h–83h includes a total of 512 bytes, and each sector utilizes the same structure. The first two bytes of each sector are reserved for a DPS Sector Data Structure Revision number to keep track of what drive protection system is being implemented. The third byte is reserved to indicate whether the current sector has been written. The next 372 bytes define the Test Result Data Structure which will be discussed in detail with reference to Tables 4 and 5. The next 136 bytes are reserved for possible future use. Finally, a Checksum is the last byte in a sector, and it is used to indicate whether a signature has been written to the specified sector location. The checksum is the two's compliment of the 8-bit sum of the first 511 bytes.

TABLE 2

| Sector | Description | Bytes | Format | Signature |
|---|---|---|---|---|
| 80h | Data Structure Revision 0x0001 | 2 | Binary | |
| | Sector Written | 1 | Binary | Hex value = 5Ah if sector has been written by vendor. |
| | Test Results Structure #1 | 372 | See Table 4 | |
| | Reserved (0x00) | 136 | Binary | |
| | Checksum | 1 | Binary | |
| | Total | 512 | | |
| 81h | Data Structure Revision 0x0001 | 2 | Binary | |
| | Sector Written | 1 | Binary | Hex value = 5Ab if sector has been written by vendor |
| | Test Results Structure #2 | 372 | See Table 4 | |
| | Reserved (0x00) | 136 | Binary | |
| | Checksum | 1 | Binary | |
| | Total | 512 | | |
| 82h | Data Structure Revision 0x0001 | 2 | Binary | |
| | Sector Written | 1 | Binary | Hex value = 5Ah if sector has been written by vendor. |
| | Test Results Structure #3 | 372 | See Table 4 | |
| | Reserved (0x00) | 136 | Binary | |
| | Checksum | 1 | Binary | |
| | Total | 512 | | |
| 83h | Data Structure Revision 0x0001 | 2 | Binary | |
| | Sector Written | 1 | Binary | Hex value 5Ah if sector has been written by vendor. |
| | Test Results Structure #4 | 372 | See Table 4 | |
| | Reserved (0x00) | 136 | Binary | |
| | Checksum | 1 | Binary | |
| | Total | 512 | | |

In this embodiment, information is stored in the sectors 80h–83h according to particular conditions following several rules for writing to the DPS sectors. These conditions are illustrated in Table 3 below. For example, the first sector 80h stores information written by a computer system vendor during the manufacturing of the system and after execution of an initial Drive Self Test (DST). The initial DST indicates whether the drive is good after the system is initially built and before it is shipped. The entry in sector 80h remains permanently stored on the drive and may not be overwritten by a subsequent user. However, during manufacturing there may be a need to re-test a system that has previously passed the DST. If the results are the same, sector 80h will be updated with the current test results. If the drive fails the initial DST, the drive will probably not be shipped, and the other sectors 81h–83h will not receive information. Of course, if the drive passes the initial DST, the drive will likely be shipped and possibly be subjected to future tests.

Sector 81h, on the other hand, is reserved for the first DST performed by a user after it has been shipped by the system vendor and received by the user. Sector 81h is also a permanent entry which may not be overwritten. Sector 82h is used to store most subsequent DST execution test results. The data structure is not permanently written into sector 82h unless the test results differ from the test results stored in sector 81h. Thus, if there is no change in execution status from the initial test performed after shipping (stored in sector 81h), the new test results, which are the same as those in sector 81h, are temporarily stored in sector 82h. However, if the test results change at some point, i.e. there is a test failure, those test failure results will be permanently stored in sector 82h. Thus, sector 83h is only written if the execution status for the DST results data structures differ in sectors 81h and 82h. The entry in sector 83h is always overwritten with the latest test results data structure and never becomes permanent.

The rules for writing to the DPS sectors discussed above are further summarized in Table 3. In the first scenario, the drive passes the initial DST, and the test data is stored in sector 80h. After the drive is shipped and tested a second time, the drive again passes the DST. This information is stored in sector 81h. Each subsequent test which yields a pass is stored in sector 82h, and each subsequent passing result overwrites the previous passing result found in sector 82h. In scenario one, there is no change from the test results stored in sector 81h and the test result stored in sector 82h. Therefore, sector 83h is never used.

TABLE 3

| | Scenario #1 | Scenario #2 | Scenario #3 | Scenario#4 | Scenario #5 | Signature |
|---|---|---|---|---|---|---|
| Sector 80h | PASS | PASS | PASS | PASS | FAIL | Permanent |
| Sector 81h | PASS | PASS | FAIL | FAIL | Never written | Permanent |
| Sector 82h | PASS | FAIL | PASS | FAIL | Never written | Not Permanent |
| Sector 83h | Never written | PASS/FAIL | PASS/FAIL | Never written | Never written | Not Permanent |

In the second scenario, the drive passes the initial DST and the test results are stored in sector 80h. The drive also passes the DST after shipment. These test results are stored in sector 81h. At some subsequent point, the drive fails the DST, and the failure data is stored in sector 82h. Because there is a change from sector 81h to sector 82h, sector 83h is utilized to store the results of the next DST. Sector 83h will store either a pass or failure indicating the results of any additional DST.

In the third scenario, the drive passes the initial DST. These results are stored in sector 80h. However, after shipment and the second DST, the drive shows a failure. These failed test results are stored in sector 81h. All subsequent test results are stored in sector 82h unless and until the drive passes. If the drive passes on a subsequent test, this information is permanently stored in sector 82h. Each subsequent DST result after the pass is stored in sector 83h.

In the fourth scenario, the drive passes the initial system vendor DST, and the results are stored in sector 80h. After shipment of the device, in the subsequent DST the drive returns a failure result which is stored permanently in sector 81h. Each subsequent test is stored in sector 82h. If the failure result never changes, each new test result structure simply overwrites sector 82h, and sector 83h is never utilized.

In the fifth scenario, the drive fails the initial DST before shipment. This test result is stored in sector 80h. Because of the initial failure, the device is never shipped or implemented in the system. Therefore, the remaining sectors are not utilized.

Table 4 illustrates a further breakdown of the Test Result Data Structure which includes a total of 372 bytes in the logging sector. The Test Result Data Structure can basically be broken down into three subsections. The first subsection, which includes 12 bytes, records the execution completion time of each DST. The next subsection, which includes 11 bytes, is allocated to store DST specific data. The remaining 349 bytes of the test result data structure are used to store data provided by host system.

TABLE 4

| Description | Bytes |
| --- | --- |
| Execution Completion Time | 12 |
| DST Data | 11 |
| Host Data | 349 |
| Total | 372 |

Tables 5–8 illustrate one embodiment of the DPS logging sector format. For simplicity, only the byte allocation for sector 80h is illustrated. However, it should be understood that each sector 81h–83h may also contain the same byte allocation as described with reference to sector 80h. As previously discussed, each DPS logging sector utilizes 512 bytes. The first two bytes of the DPS logging sector are reserved for the DPS sector data structure revision number. The next byte (byte 2) is reserved for a binary flag indicating whether the sector has been written. The next 12 bytes (bytes 3–14) are reserved to store the DST execution completion time broken down in month, day, year, hours, and minutes. This information tracks the exact time that the DST which is stored in the sector (here 80h) completed execution. The next 11 bytes (bytes 15–25) are reserved for DST data, which may include the log sector data structure revision number, the execution number, the execution status value, the power-on hours, the failure checkpoint, and the LBA of the first failure.

TABLE 5

| Entry Name | Bytes | Format |
| --- | --- | --- |
| Sector 80 h | | |
| Vendor DPS Sector Data Structure Rev. # | 0–1 | Binary |
| Vendor Sector Written Signature | 2 | Binary |
| Month | 3–4 | ASCII |
| Day | 5–6 | ASCII |
| Year | 7–10 | ASCII |
| Hours | 11–12 | ASCII |
| Minutes | 13–14 | ASCII |
| DST Log Sector Data Structure Rev. # | 15–16 | Binary |
| DST Execution Number | 17 | Binary |
| DST Execution Status Value | 18 | Binary |
| Power-on Hours | 19–20 | Binary |
| DST Failure Checkpoint | 21 | Binary |
| LBA of 1$^{st}$ Failure | 22–25 | Binary |
| DPS Activation Value | 26 | Decimal (See Table 6) |
| DPS Activation Rev. # | 27–34 | ASCII |
| ATA Conductor Cable | 35 | Binary (See Table 7) |
| ATA Device Location | 36 | Binary (See Table 8) |
| Device #1 Model | 37–76 | ASCII |
| Device #1 Firmware | 77–84 | ASCII |
| Device #1 S/N | 85–104 | ASCII |
| Device #2 Model | 105–144 | ASCII |
| Device #2 Firmware | 145–152 | ASCII |
| Device #2 S/N | 153–172 | ASCII |
| Device #3 Model | 173–212 | ASCII |
| Device #3 Firmware | 213–220 | ASCII |
| Device #3 S/N | 221–240 | ASCII |
| Device #4 Model | 241–280 | ASCII |
| Device #4 Firmware | 281–288 | ASCII |
| Device #4 S/N | 289–308 | ASCII |
| Vendor System SIN | 309–324 | ASCII |
| Configuration ID (TBD) | 325–342 | ASCII |
| Vendor System ROM | 343–374 | ASCII |
| Reserved (0x00) | 375–510 | Binary |
| Data Structure Checksum | 511 | Binary |
| Sector 81 h | | |
| Sector 82 h | | |
| Sector 83 h | | |

Byte 26 stores the DPS activation value. Table 6 illustrates the 8-bit breakdown of byte 26. The DPS activation value stored in byte 26 indicates how the DST was activated and from what type of device it was activated. As indicated, the DST can be implemented from a variety of sources including the system BIOS when the system is booted, manufacturing or vendor diagnostics, or user-supplied diagnostics.

TABLE 6

| Value | Description | Value | Description |
| --- | --- | --- | --- |
| Bits 7–4 | | Bits 3–0 | |
| 0 | Commercial Desktops | 0 | Self-Test Executed by BIOS |
| 1 | Commercial Portables | 1 | Self-Test Executed by MFG. Diags |
| 2 | Consumer Desktops | 2 | Self-Test Executed by User Diags |
| 3 | Consumer Portables | 3 | Self-Test Executed by Vendor PC Storage |
| 4–15 | Reserved | 4 | Self-Test Executed by Other |
| | | 5–15 | Reserved |

Referring again to Table 5, bytes 27–34 store the DPS activation revision number. The following byte 35 provides information indicating whether the conductor cable is a 40-pin or 80-pin cable. As illustrated in Table 7, only the first two bits of byte 35 are used to store this information, with the remaining bits being reserved for possible future use.

TABLE 7

| Bit | Description |
| --- | --- |
| 0 | 40-Pin Conductor Cable |
| 1 | 80-Pin Conductor Cable |
| 2–7 | Reserved |

Referring to Tables 5 and 8, byte 36 is reserved for the ATA device location. In particular, Table 8 describes the bit configuration which indicates the device location. In this embodiment, one of the first six bits may be set to designate a type of controller to which the device is attached, while the remaining two bits are reserved for possible future use.

TABLE 8

| Bit | Description |
| --- | --- |
| 0 | Device attached to primary/master controller |
| 1 | Device attached to primary/slave controller |
| 2 | Device attached to secondary/master controller |
| 3 | Device attached to secondary/slave controller |
| 4 | Device attached to 3$^{rd}$ party controller |
| 5 | Secondary controller is in Expansion base |
| 6–7 | Reserved |

The next 272 bytes (37–308) illustrated in Table 5 are reserved for the drive information data structures. This embodiment, each sector can store information on up to four ATA supported such as hard drives, CD ROMs, DVDs, and LS 120 floppy drives. During the DST, the model firmware and serial number are recorded for each ATA drive which is present in the system at that time. Bytes 309–324 are used to store the serial number of the computer system. Currently, bytes 325–342 are not used, but they may be used for uses in the future, such as to store a system configuration identification. Bytes 343–374 are allocated to store the information on the ROM device used in the computer system. Bytes 375–510 are currently reserved for possble future use by the system vendor. Finally, byte 511 is used to store the checksum typically a two's compliment of the sum of the first 511 bytes in the data structure. The checksum indicates whether a signature has been written to its specified sector location.

Figure 2:
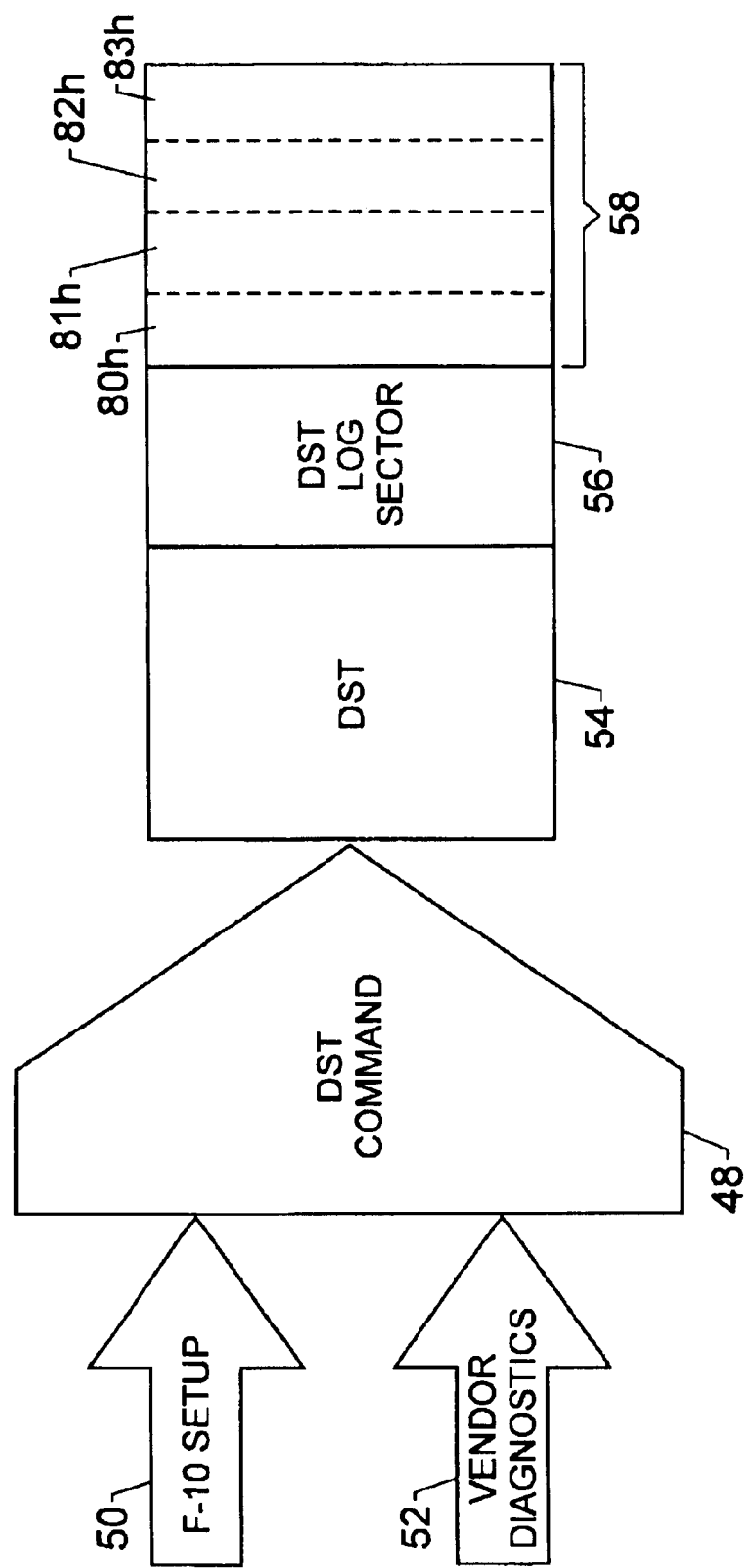
FIG. 2 illustrates a block diagram of a drive protection system in accordance with the present invention.

FIG. 2 illustrates a block diagram of one embodiment of the present technique. Currently, there are two vendor-provided ways to invoke the Drive Self Test (block 48): F10 Set-Up (block 50) and the vendor diagnostics (block 52). F-10 Set-Up (block 52) is resident in the drive's firmware as part of the BIOS set-up. The DST may also be invoked through the Vendor Diagnostics (block 52), although there is the possibility that the Vendor Diagnostics (block 52) may have been damaged with the drive since the Vendor Diagnostics (block 52) is a software application which is implemented through Windows. Both the F10 set-up (block 50) and the Vendor Diagnostics (block 52) can implement the Drive Self Test command (block 48). The DST block (block 54) contains the self test and is responsible for returning error codes associated with the self test. There is also a DST logging sector (block 56). The next section illustrates the DPS sectors 80h–83h (block 58). As previously indicated these sectors 80h–83h are reserved sectors which may not be overwritten by non-DPS data. The first sector 80h is the vendor logging sector which will log the results of the first DST. The remaining three sectors are reserved for the test results associated with the DSTs performed once the drive leaves the factory as discussed previously.

Table 9 indicates how each byte of the DPS sector (illustrated in Table 5) is obtained. As indicated, the sector segment may be hard-coded onto the drive, implemented through a standard ROM device in the system, obtained through the standard ROM device, or implemented through custom subroutines written to gather information from the specified locations.

TABLE 9

| Sector Segment | ROM Source for Information |
| --- | --- |
| Vendor DPS Sector Data Structure REV. | Hard-coded |
| Vendor Sector Written Signature | Hard-coded |
| Month | Read from system Real Time Clock via std ROM service |
| Day | Read from system Real Time Clock via std ROM service |
| Year | Read from system Real Time Clock via std ROM service |
| Hours | Read from system Real Time Clock via std ROM service |
| Minutes | Read from system Real Time Clock via std ROM service |
| DST Log Sector Data Structure Rev. # | Read from drive's Self Test Log Descriptor via custom code |
| DST Execution Number | Specified per phase of testing (quick/comprehensive test) |
| DST Execution Status Value | Read from drive's SMART data structure via custom code |
| Power-On Hours | Read from drive's Self Test Log Descriptor via custom code |
| DST Failure Checkpoint | Read from drive's Self Test Log Descriptor via custom code |
| LBA of 1$^{st}$ Failure | Read from drive's Self Test Log Descriptor via custom code |
| DPS Activation Value | Hard-coded |
| DPS Activation Rev. # | Not used-redundant with Vendor system ROM Information |
| ATA Conductor Cable | Obtained from existing ROM Internal data structure |
| ATA Device Location | Obtained from existing ROM Internal data structure |
| Device #1 Model | Read from drive's Identity Device Data via custom code |
| Device #1 Firmware | Read from drive's Identity Device Data via custom code |
| Device #1 S/N | Read from drive's Identity Device Data via custom code |
| Device #2 Model | Read from drive's Identity Device Data via custom code |
| Device #2 Firmware | Read from drive's Identity Device Data via custom code |
| Device #2 S/N | Read from drive's Identity Device Data via custom code |
| Device #3 Model | Read from drive's Identity Device Data via custom code |
| Device #3 Firmware | Read from drive's Identity Device Data via custom code |
| Device #3 S/N | Read from drive's Identity Device Data via custom code |
| Device #4 Model | Read from drive's Identity Device Data via custom code |
| Device #4 Firmware | Read from drive's Identity Device Data via custom code |
| Device #4 S/N | Read from drive's Identity Device Data via custom code |
| Vendor System S/N | Obtained from std ROM service |

TABLE 9-continued

| Sector Segment | ROM Source for Information |
| --- | --- |
| Configuration ID (TBD) | Not used |
| Vendor System ROM | Obtained from std ROM service |
| Reserved (0x00) | Hard-coded |
| Data Structure Checksum | Dynamically calculated |

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A disk drive comprising:
 at least one sector of the disk drive being protected from reformatting; and
 a data structure defined within the at least one sector, the data structure being defined to store information correlative to a test performed on the disk drive after manufacture.

2. The disk drive, as set forth in claim 1, wherein the information comprises:
 a revision number.

3. The disk drive, as set forth in claim 1, wherein the information comprises:
 a write indicator for the at least one sector.

4. The disk drive, as set forth in claim 1, wherein the information comprises:
 the time of performance of the test.

5. The disk drive, as set forth in claim 1, wherein the information comprises:
 a failure of the test.

6. The disk drive, as set forth in claim 1, wherein the information comprises:
 a type of device in which the disk drive was located during the test.

7. The disk drive, as set forth in claim 1, wherein the information comprises:
 an indication of how the test was activated.

8. The disk drive, as set forth in claim 1, wherein the information comprises:
 a type of conductor coupled to the disk drive.

9. The disk drive, as set forth in claim 1, wherein the information comprises:
 an identification of the tested disk drive.

10. The disk drive, as set forth in claim 1, wherein the information comprises:
 an identification of a tested device other than the disk drive.

11. The disk drive, as set forth in claim 1, wherein the information comprises:
 a serial number of a computer system in which the disk drive was located during the test.

12. The disk drive, as set forth in claim 1, wherein the information comprises:
 a checksum of the data structure.

13. A computer system comprising:
 a processing unit;
 a disk drive operatively coupled to the processing unit, at least one sector of the disk drive being protected from reformatting; and
 a data structure defined within the at least one sector, the data structure being defined to store information correlative to a test performed on the computer system after manufacture.

14. The computer system, as set forth in claim 13, comprising:
 a housing in which the processing unit and the disk drive are located.

15. The computer system, as set forth in claim 13, comprising:
 a display operatively coupled to the processing unit.

16. The computer system, as set forth in claim 13, comprising:
 an input device operatively coupled the processing unit.

17. The computer system, as set forth in claim 13, wherein the information comprises:
 a revision number.

18. The computer system, as set forth in claim 13, wherein the information comprises:
 a write indicator for the at least one sector.

19. The computer system, as set forth in claim 13, wherein the information comprises:
 the time of performance of the test.

20. The computer system, as set forth in claim 13, wherein the information comprises:
 a failure of the test.

21. The computer system, as set forth in claim 13, wherein the information comprises:
 a type of device in which the disk drive was located during the test.

22. The computer system, as set forth in claim 13, wherein the information comprises:
 an indication of how the test was activated.

23. The computer system, as set forth in claim 13, wherein the information comprises:
 a type of conductor coupled to the disk drive.

24. The computer system, as set forth in claim 13, wherein the information comprises:
 an identification of the tested disk drive.

25. The computer system, as set forth in claim 13, wherein the information comprises:
 an identification of a tested device other than the disk drive.

26. The computer system, as set forth in claim 13, wherein the information comprises:
 a serial number of a computer system in which the disk drive was located during the test.

27. The computer system, as set forth in claim 13, wherein the information comprises:
 a checksum of the data structure.

28. The computer system, as set forth in claim 13, comprising:

a testing routine stored in firmware.

29. The computer system, as set forth in claim 13, comprising:

a testing routine stored on the disk drive.

30. A method of storing information correlative to a test performed after manufacture on a device of a computer system, the method comprising the acts of:

(a) providing a disk drive having at least one sector being protected from reformatting; and (b) storing information correlative to the test in the at least one sector of the disk drive after manufacture.

31. The method, as set forth in claim 30, wherein act (a) comprises the act of:

purchasing the disk drive.

32. The method, as set forth in claim 30, wherein act (a) comprises the act of:

manufacturing the disk drive.

33. The method, as set forth in claim 30, wherein act (a) comprises the act of:

formatting the disk drive to define the at least one sector as being protected from reformatting.

34. The method, as set forth in claim 30, wherein act (a) comprises the act of:

defining a data structure within the at least one sector to store information correlative to the test performed on the computer system.

35. The method, as set forth in claim 30, wherein act (b) comprises the act of:

storing a revision number.

36. The method, as set forth in claim 30, wherein act (b) comprises the act of:

storing a write indicator for the at least one sector.

37. The method, as set forth in claim 30, wherein act (b) comprises the act of:

storing the time of performance of the test.

38. The method, as set forth in claim 30, wherein act (b) comprises the act of:

storing information correlative to a failure of the test.

39. The method, as set forth in claim 30, wherein act (b) comprises the act of:

storing information correlative to a type of device in which the disk drive was located during the test.

40. The method, as set forth in claim 30, wherein act (b) comprises the act of:

storing an indication of how the test was activated.

41. The method, as set forth in claim 30, wherein act (b) comprises the act of:

storing a type of conductor coupled to the disk drive.

42. The method, as set forth in claim 30, wherein act (b) comprises the act of:

storing an identification of the tested disk drive.

43. The method, as set forth in claim 30, wherein act (b) comprises the act of:

storing an identification of a tested device other than the disk drive.

44. The method, as set forth in claim 30, wherein act (b) comprises the act of:

storing a serial number of the computer system in which the disk drive was located during the test.

45. The method, as set forth in claim 30, wherein act (b) comprises the act of:

storing a checksum of the data structure.

46. The method, as set forth in claim 30, wherein act (b) comprises the act of:

executing a testing routine stored in firmware.

47. The method, as set forth in claim 30, wherein act (b) comprises the act of:

executing a testing routine stored on the disk drive.

48. A method of facilitating testing of a disk drive, the method comprising the acts of:

(a) defining at least one sector of the disk drive as being protected from reformatting; and (b) defining a data structure in the at least one sector of the disk drive to store information correlative to the test performed after manufacture.

49. The method, as set forth in claim 48, wherein act (a) comprises the act of:

formatting the disk drive to define the at least one sector as being protected from reformatting.

50. The method, as set forth in claim 48, wherein act (b) comprises the act of:

defining a location in the at least one sector for storing a write indicator for the at least one sector.

51. The method, as set forth in claim 48, wherein act (b) comprises the act of:

defining a location in the at least one sector for storing the time of performance of the test.

52. The method, as set forth in claim 48, wherein act (b) comprises the act of:

defining a location in the at least one sector for storing information correlative to a failure of the test.

53. The method, as set forth in claim 48, wherein act (b) comprises the act of:

defining a location in the at least one sector for storing information correlative to a type of device in which the disk drive was located during the test.

54. The method, as set forth in claim 48, wherein act (b) comprises the act of:

defining a location in the at least one sector for storing an indication of how the test was activated.

55. The method, as set forth in claim 48, wherein act (b) comprises the act of:

defining a location in the at least one sector for storing a type of conductor coupled to the disk drive.

56. The method, as set forth in claim 48, wherein act (b) comprises the act of:

defining a location in the at least one sector for storing an identification of the tested disk drive.

57. The method, as set forth in claim 48, wherein act (b) comprises the act of:

defining a location in the at least one sector for storing an identification of a tested device other than the disk drive.

58. The method, as set forth in claim 48, wherein act (b) comprises the act of:

defining a location in the at least one sector for storing a serial number of the computer system in which the disk drive was located during the test.

59. The method, as set forth in claim 48, wherein act (b) comprises the act of:

defining a location in the at least one sector for storing a checksum of the data structure.

60. A method of testing a disk drive, the method comprising the act of:

(a) reviewing information correlative to a test performed after manufacture, the information being stored in at least one sector of the disk drive being protected from reformatting.

61. The method, as set forth in claim 60, wherein act (a) comprises the act of:

reviewing a revision number.

62. The method, as set forth in claim 60, wherein act (a) comprises the act of:

reviewing a write indicator for the at least one sector.

63. The method, as set forth in claim 60, wherein act (a) comprises the act of:

reviewing the time of performance of the test.

64. The method, as set forth in claim 60, wherein act (a) comprises the act of:

reviewing information correlative to a failure of the test.

65. The method, as set forth in claim 60, wherein act (a) comprises the act of:

reviewing information correlative to a type of device in which the disk drive was located during the test.

66. The method, as set forth in claim 60, wherein act (a) comprises the act of:

reviewing an indication of how the test was activated.

67. The method, as set forth in claim 60, wherein act (a) comprises the act of:

reviewing a type of conductor coupled to the disk drive.

68. The method, as set forth in claim 60, wherein act (a) comprises the act of:

reviewing an identification of the tested disk drive.

69. The method, as set forth in claim 60, wherein act (a) comprises the act of:

reviewing an identification of a tested device other than the disk drive.

70. The method, as set forth in claim 60, wherein act (a) comprises the act of:

reviewing a serial number of the computer system in which the disk drive was located during the test.

71. The method, as set forth in claim 60, wherein act (a) comprises the act of:

reviewing a checksum of the data structure.

72. A method comprising:

reserving a plurality of sectors in a disk drive, wherein each of the plurality of sectors is protected from reformatting;

storing results of a first drive self test (DST) performed at manufacture in a first of the plurality of sectors; and reserving a second of the plurality of sectors for results of a second drive self test (DST) to be performed by a user after manufacture.

73. The method, as set forth in claim 72, further comprising:

reserving a third of the plurality of sectors for results of a third drive self test (DST) to be performed by a user after manufacture; and reserving a fourth of the plurality of sectors for results of a fourth drive self test (DST) to be performed by a user after manufacture.

74. A method comprising:

permanently writing results of a first drive self test (DST) to a first of a plurality of sectors, at manufacture wherein each of the plurality of sectors is protected from reformatting; and permanently writing results of a second drive self test (DST) to a second of the plurality of sectors after manufacture.

75. The method, as set forth in claim 74, further comprising:

performing a third drive self test (DST);

comparing results of the third DST with the results of the second DST;

if the results from the third DST are the same as the results of the second DST, temporarily writing the results of the third DST to a third of the plurality of sectors; and if the results from the third DST are different from the results of the second DST, permanently writing the results of the third DST to the third of the plurality of sectors.

\* \* \* \* \*